United States Patent [19]
Schweitzer, III et al.

[11] Patent Number: 5,793,750
[45] Date of Patent: Aug. 11, 1998

[54] SYSTEM OF COMMUNICATING OUTPUT FUNCTION STATUS INDICATIONS BETWEEN TWO OR MORE POWER SYSTEM PROTECTIVE RELAYS

[75] Inventors: Edmund O. Schweitzer, III; Gary W. Scheer, both of Pullman, Wash.

[73] Assignee: Schweitzer Engineering Laboratories, Inc., Pullman, Wash.

[21] Appl. No.: 655,008

[22] Filed: May 29, 1996

Related U.S. Application Data

[63] Continuation of Ser. No. 546,477, Oct. 20, 1995, abandoned.
[51] Int. Cl.$^6$ .................................................. H02H 7/26
[52] U.S. Cl. ..................................... 370/242; 361/64
[58] Field of Search ........................ 370/16, 161, 94.1, 370/99, 241, 242, 243, 244, 245, 246, 247, 252; 340/825, 825.06, 825.07, 825.16, 825.18; 361/62, 63, 64, 65, 66, 67, 68, 69, 76, 77, 80, 81, 82

[56] References Cited

U.S. PATENT DOCUMENTS

| | | |
|---|---|---|
| 4,020,396 | 4/1977 | Gambale et al. .................... 370/64 |
| 4,551,718 | 11/1985 | Cookson et al. .................... 340/825.16 |
| 4,972,290 | 11/1990 | Sun et al. .................................. 361/64 |
| 5,218,465 | 6/1993 | Lebby et al. ............................. 359/110 |
| 5,235,599 | 8/1993 | Nishimura et al. ..................... 370/16 |
| 5,267,231 | 11/1993 | Dzieduszko ............................. 270/14 |
| 5,283,781 | 2/1994 | Buda et al. .............................. 370/246 |
| 5,311,508 | 5/1994 | Buda et al. .............................. 370/476 |
| 5,428,553 | 6/1995 | Chiba et al. ............................. 364/492 |
| 5,461,607 | 10/1995 | Miyagi et al. ............................ 370/16 |
| 5,481,532 | 1/1996 | Hassan et al. ........................... 370/16 |
| 5,576,625 | 11/1996 | Sukegawa et al. ...................... 324/424 |

*Primary Examiner*—Alpus H. Hsu
*Assistant Examiner*—Kwang B. Yao
*Attorney, Agent, or Firm*—Jensen & Puntigam, P.S.

[57] ABSTRACT

The communication system includes transmitting output status bits indicative of a function of the relay directly from one microprocessor-based protective relay in a power system to a second companion microprocessor-based relay. Each relay has transmit and receive modules connected by a communications link, with the transmit and receive modules using the logic output and input bits produced by the respective relays in their respective relay calculations.

7 Claims, 3 Drawing Sheets

SYSTEM OF COMMUNICATING OUTPUT FUNCTION STATUS INDICATIONS BETWEEN TWO OR MORE POWER SYSTEM PROTECTIVE RELAYS

TECHNICAL FIELD

This application is a continuation, under 37 C.F.R. 1.53 of prior U.S. patent application Ser. No. 08/546,477, filed on Oct. 20, 1995 now abandonded on Sep. 9, 1996.

This invention relates generally to data communication between protective relays on a power system, and more specifically concerns the communication of output function status information in the form of data bits between such relays.

BACKGROUND OF THE INVENTION

Power systems in general comprise an interconnected arrangement of transmission lines, distribution buses and feeder lines. Such systems require a plurality of protective relays connected to the various power lines at several locations in the overall system to provide comprehensive, reliable fault protection. Such comprehensive protection ensures that in the event of a fault on one portion of the system, only a small part of the overall system will be out of service until the fault is corrected. Accurate fault indications, with minimal out-of-service time, is an important goal of protection systems.

A comprehensive, secure protection system requires that individual relays communicate with each other relative to the status of their respective monitoring functions. In one example, for a single transmission line involving local and remote stations, the relay at the local station must be able to communicate with the remote station relay if the local station relay recognizes a fault. In order to do this, a function status signal indicative of the fault condition produced in the local station relay will be used to set an output contact at the local relay. The setting of the output contact is sensed by conventional communications equipment, which provides an indication over a data link, such as a change in signal frequency, to similar communications equipment at the remote station.

The communications equipment at the remote station will in turn set output contacts, the status of which will be recognized by input-sensing capability in the remote relay. The remote relay will then use that input contact information, along with other input information, such as the voltage and current values on the power line, to perform its own calculations. The remote relay will then set output contacts as appropriate and the status of those contacts is communicated back to the local relay through the communications equipment. An example of such a station is shown in U.S. Pat. No. 4,551,718, to Cookson, et al. There are many different commercial implementations of such a communication system. The purpose of this back and forth communication between the two relays in the above example is to identify the location of the fault relative to the two relays. This process of communication, while necessary for good protection, is time-consuming and requires a significant amount of expensive communications equipment.

The above example of local and remote relays communicating relative to a specific fault condition has counterparts in several other different one-to-one (two-way), one-way or three-way communication requirements between relays for various control and monitoring functions relative to the power system. Such a communication arrangement between protective relays in a power transmission system has the disadvantages of expense and the time required for contact output assertion, sensing and communication; it would be beneficial for power protection systems in general if such disadvantages could be decreased or even eliminated.

DISCLOSURE OF THE INVENTION

Accordingly, the present invention is a system for communicating the status of output bits from one protective relay to a second protective relay in a power system, wherein the relay output bits are the result of a fault determination calculation process in the one relay which would conventionally be used to set output contacts of said one relay, comprising: means at the one relay for formatting the output status bits to be transmitted into a data packet; means for transmitting that data packet directly over a communications link to said second relay; and means at the second relay for receiving said data packet, verifying the validity of said data packet and then using said output bits in the data packet as input bits in its own fault determination calculation process.

BEST MODE FOR CARRYING OUT THE INVENTION

Figure 1:
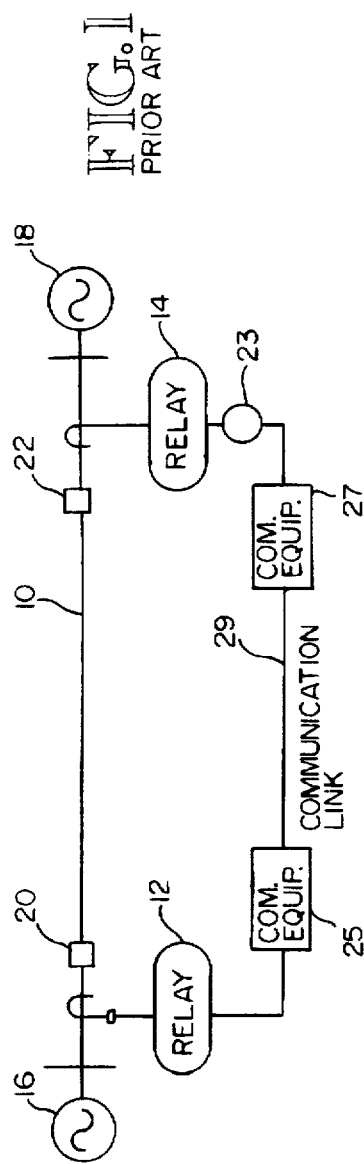
FIG. 1 is a block diagram of a prior art relay-to-relay data communication arrangement in a power system.

FIG. 1 shows a prior art communication system for power system protective relays used with a transmission line 10, incorporating two protective relays 12 and 14, with relay 12 being associated with a local source 16 and relay 14 with a remote source 18. Circuit breakers 20 and 22, respectively, are associated with the two relays. Each relay has its own associated communications equipment, 25 and 27, respectively, while a contact input/output arrangement connects each relay with its associated communications equipment. These are shown representationally at 21 and 23, respectively, even though they may be part of the relay or communications equipment. A communications link 29 connects the two communications equipment.

Communication between the two relays 12 and 14 is important to identify the location of a fault which occurs on line 10. For example, if the fault is located between the two relays, both relays will eventually trip (they should), while if the fault is behind local relay 12, relay 14 should not trip its circuit breaker 22. In order to accomplish this desired result, when relay 12 recognizes a fault on line 10 within its zones of protection, an indication of that recognition is transmitted to remote relay 14. This indication is used by relay 14 in its own logic calculation functions, which include the measured line voltages and currents, relative to its own zones of protection.

Such two-way communication results in reliable and secure protection for the power system. Such communication arrangements, furthermore, are common with microprocessor-based relays. In such relays, the calculations result in the generation of output function bits or variables, which bits are then used to assert selected output contacts indicating the existence of particular conditions, such as the presence of a fault. The status of the various output contacts on the relay, of which there typically are several, is monitored by the communications equipment associated with that relay; when a change in status of a relay 12 output contact 21 is recognized, the communications equipment 25 transmits a signal indicating the status of the output contact over the communication link 29 to the communications equipment 27 associated with companion relay 14.

An example of typical communication equipment is trip and guard audio tone channel equipment. The communications link 29 can be microwave, audio, fiberoptics or some other link. Correspondingly, output function indications produced in the remote relay 14 are used to set its own output contacts, to which its own communication equipment 27 is responsive, which in turn communicates those indications to the communications equipment 25 of the local relay, which in turn senses certain of its input contacts 21 accordingly.

The above example concerns two-way communication between two protective relays. If the communication arrangement involves three relays, then equipment must be provided for communications between each of the three relays.

It should be understood that in a power system, two-way, three-way and in some cases one-way relay communication between two or three relays have a wide variety of purposes. Specific examples include permissive over-reaching transfer trip (POTT), permissive under-reaching transfer trip (PUTT), directional comparison unblocking (DCUB), directional comparison blocking (DCB) and direct transfer trip applications. Also possible is one-way communication between several protective relays on power lines which all feed to a relay protecting a distribution bus. Such a distribution bus arrangement allows the protective relay on the bus to efficiently analyze the status and function of the relays in its entire distribution system.

Hence, in a typical power system, a significant amount of data communications equipment and data linkages must be provided to accomplish the above-described communication functions. Such communications equipment is, however, as indicated above, expensive, and furthermore results in time delays in relay processing functions. Such a time delay is important, since most solid-state, microprocessor-based protective relays are processing and monitoring the power signal in real time on the basis of one-quarter, one-eighth or one-sixteenth of a cycle samples of line voltages and currents. For example, if the power system is operating at a 60 Hz frequency, one-sixteenth of a cycle is approximately 1.08 milliseconds. Hence, calculations and other monitoring functions are performed approximately once each millisecond. It would be desirable to have a communications system which is comparable in speed to the sampling and calculation functions of the relay itself.

Figure 2:
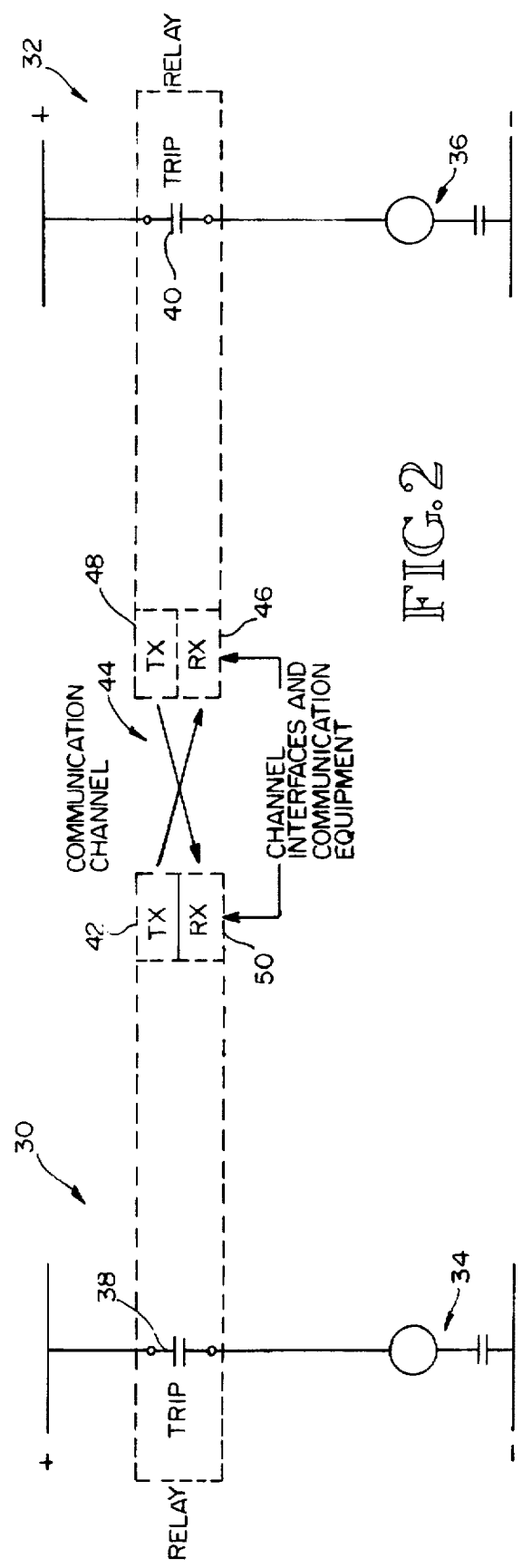
FIG. 2 is a diagram of the relay-to-relay data communication system of the present invention.

FIG. 2 shows a simplified view of the relay-to-relay communication system of the present invention. In FIG. 2, two relays 30 and 32 are partially shown. Trip elements 34 and 36 are shown as are relay output contacts 38 and 40. In the prior art system of FIG. 1, if relay 30 had produced a trip indication bit or other output status bit, that output status bit would be used to set an output contact in relay 30. This would then be used as explained above for FIG. 1.

In the system of the present invention, however, the original output status indication or bit from relay 30 is transmitted directly via a transmit module 42 in relay 30 over a communications channel 44 to a receive module 46 in remote relay 32. The received bit is then used directly by relay 32 in its own logic operations, with the other data inputs thereto, to determine whether or not a local trip at relay 32 should be issued. Conversely, output status function bits generated by remote relay 32 are transmitted by its transmit module 48 to receive module 50 in relay 30, which then uses that information in its logic calculations, along with the other inputs.

Hence, in the present invention, each relay having the above-described communications capability will use its input information, in the form of voltage and current data from the power system signal, as well as other input information received from its companion relay and perhaps other relays and devices as well to perform its ongoing calculations and resulting protective functions. If tripping of its associated circuit breaker is indicated, then a function status bit or output bit is produced, which is in turn transmitted directly to its companion relay, which uses that information as one of its own inputs to perform its own ongoing calculations and monitoring functions, producing a trip signal when indicated. The output contacts, input contacts and communications equipment present at each relay in previous systems are thus completely eliminated with the system of the present invention. Output function status bits generated by each relay are used directly by both relays in the present system.

Figure 3:
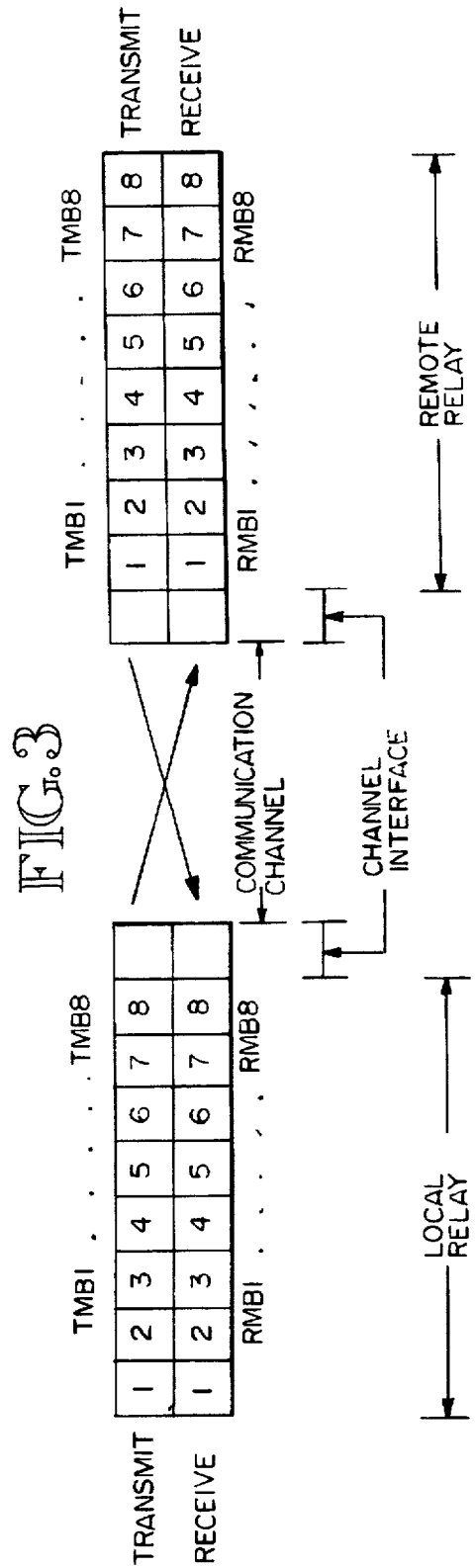
FIG. 3 is a diagram showing the arrangement of data for transmission between power system protective relays for the communication system of FIG. 2.

FIG. 3 shows the arrangement of the data bits for communication between two relays for the embodiment shown. The data to be transmitted comprises eight possible successive bits, referred to herein as TMB1 through TMB8, for transmit "mirror" bits 1–8. Each of these successive bits represents the output status of one of the output functions of a given relay. In previous systems, there would be, for instance, eight output contacts, each one of which is responsive to the logic output status of a separate function of the relay. This sequence of bits is transmitted over a data channel which connects the two relays. The data channel may have various implementations, including, for example, microwave, fiberoptic or radio channels. Each relay further will have a conventional interface element to interface the relay with the data channel.

The eight data bits received at the other relay are referred to as RMB1 through RMB8, for receive "mirror" bits 1–8. The term "mirror" is used to indicate that the bits at the receive end are the same as the bits at the transmit end. The TMB and RMB designations are, however, arbitrary and could be changed. In addition, while the present invention uses a total of eight output status data bits or variables, a different number could be used, depending upon the particular relays used and the communication requirements.

Typically, in a two-relay communications configuration, two or perhaps three bits are actually needed. For example, for a two-terminal, single pole trip output status function, a "key" bit, i.e. a bit representing the output function status, is needed for A, B and C phases. The remaining bit spaces are thus not used in such an application. The number of bits required for a particular arrangement will depend upon the particular functions provided by the relay and the need for communicating the output status associated with those functions to the companion relay.

Since the relays used with this invention are typically microprocessor-based relays, a programmable capability for the function settings of the relay may be present in the relay. The programmable feature of the relay would permit the operator to configure or set the use of each input or output element/function and hence the use of the input and output bits relative to the monitoring capability of the relay. For instance, one relay can be programmed so that its output status variables follow the programmed group selection settings which determine the operation of the relay, while the other relay can correspond its group selection settings to the particular received bits from the one relay. The other relay will thus change setting groups to match the selected setting group in the one relay. This is helpful in those situations where the system being monitored changes status in a known way during operation.

Hence, programmable logic can be used for the communication arrangement described above, as well as for other aspects of the operation of the relay, where the relays have a programmable capability. Typically, the setting commands are provided through a serial port from a terminal or personal computer, or they can be provided through front panel controls, or through a combination of both.

Figure 4:
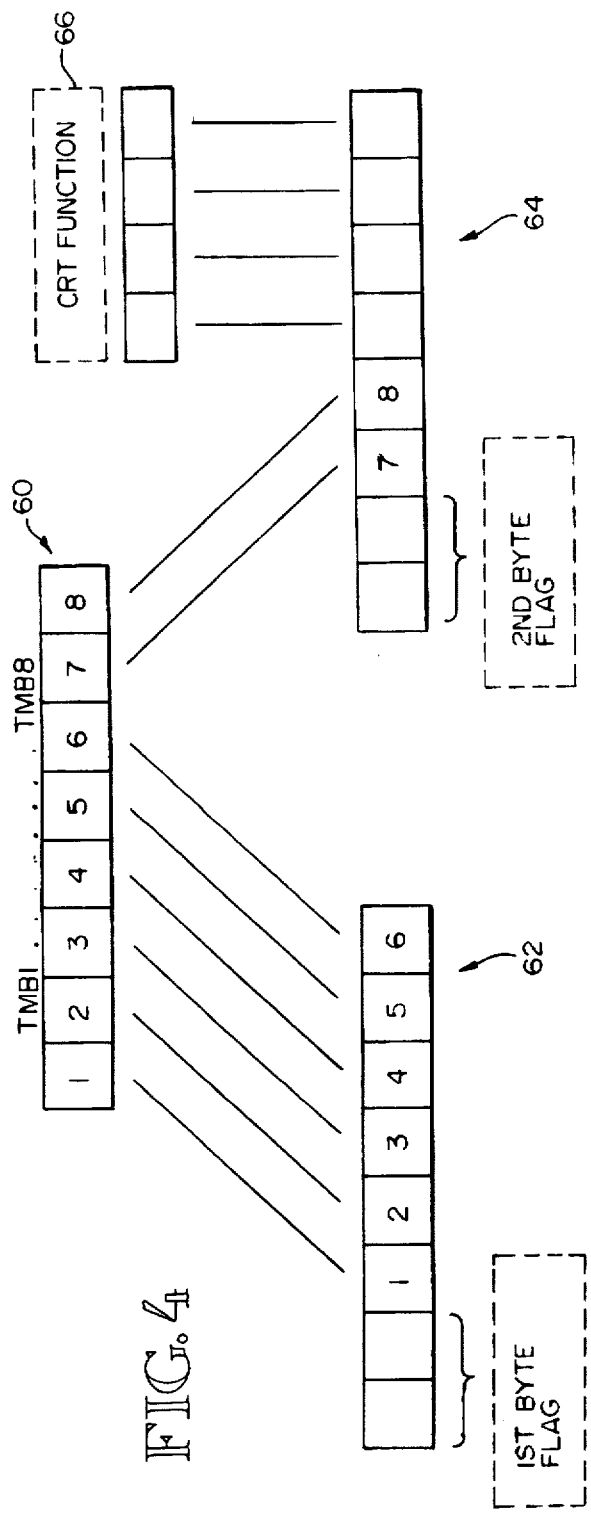
FIG. 4 is a diagram showing a complete data packet used in the communication system of FIG. 2.

Another important aspect of the communications system described above concerns the reliability, i.e. security, of the transmitted data. A typical data transmission will have various validity checks built into it. One example of a validity check system is shown in FIG. 4. In FIG. 4, the eight bits of transmitted data 60 are divided into two separate bytes 62 and 64, which together form a single data packet. Each byte comprises a total of eight bits, with the first two bits of each byte being a flag indicating the existence of a data packet being transmitted. Accordingly, the first two bits of byte 62 is a byte flag 63. The remaining six bits of the first byte 62 are the first six bits of actual data. The first two bits of the second byte comprise a second byte flag 65, indicating the presence of the second byte, followed by the seventh and eighth bits of transmitted data, followed by four bits which comprise a cyclic redundancy check (CRC) from a CRC function 66.

The combination of the two bytes 62, 64 with their respective byte flags, which must be received within a specified time of each other, and the cyclical redundancy check, provides the required security for the data packet transmission. It should be understood, however, that other data transmission security techniques could be used. The security provides immunity from erroneous data which may come in the form of noise bursts or other interference.

Figure 5:
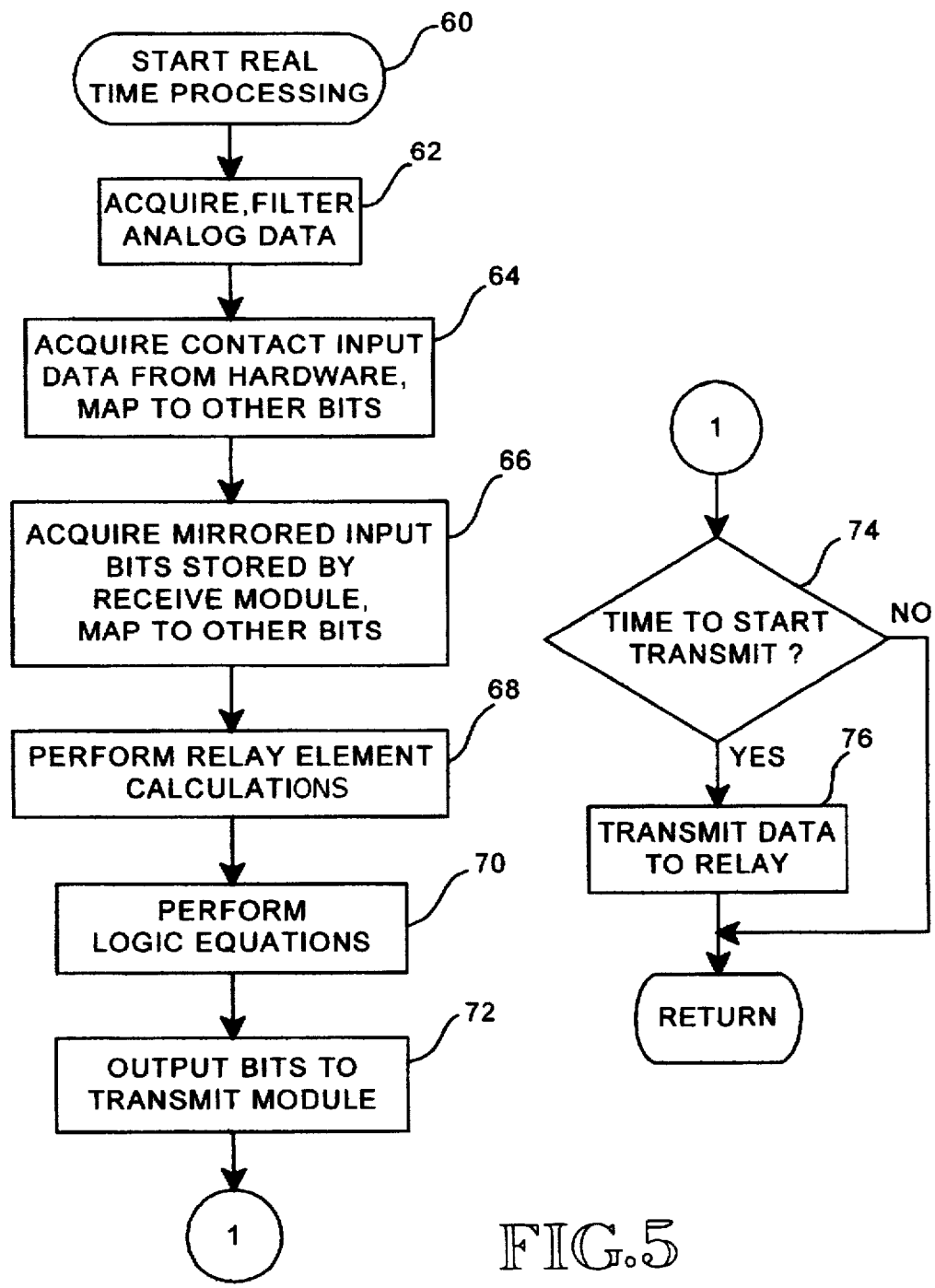
FIG. 5 is a software flow chart for the communication system of FIG. 2.

FIG. 5 shows a basic software flow chart for control of communication of the output status variables (bits). The communication is done in real time, with the process having a start point, as shown at block 60. Block 62 represents the acquisition and the initial processing of the voltage and current data obtained from the power system. Block 64 represents the acquisition of input data from other hardware, while block 66 represents acquired input bits from the companion relay, which have been stored by the receive module in the receive relay. These bits are mapped or located with respect to other bits.

The receive relay then uses the acquired analog data as well as the other input data, including the input bits from the companion relay, to perform its protective monitoring and calculation functions, as shown in block 68. In addition, as explained above, various logic equations may be performed on the data in accordance with the programmable logic established in the relay, as shown in block 70. The results of the calculations, in the form of output bits, is then sent to the transmit module of the relay, as shown in block 72. If it is the correct time to transmit, as indicated in block 74, then the data is transmitted to the companion relay, as shown in block 76. After the data transmission is completed, the process begins again. This occurs at regular, specific intervals, such as for example, once every one-sixteenth of a power system cycle.

Hence, a new communication arrangement has been disclosed between protective relays in a power transmission system, eliminating a substantial amount of heretofore conventional hardware, and thereby reducing the cost of the overall system significantly. The communication system can be used in a two-way arrangement between two or more relays, or it can be used in a one-way arrangement between a plurality of relays and another relay, such as a plurality of protective relays communicating with a single bus relay.

Although a preferred embodiment of the invention has been disclosed herein for illustration, it should be understood that various changes, modifications and substitutions may be incorporated in such embodiment without departing from the spirit of the invention which is defined by the claims which follow.

What is claimed is:

1. A system for communicating the status of output bits from one protective relay to a second protective relay in a power system, wherein the relay output bits are the result of a fault determination calculation process in the one relay which would conventionally be used to set output contacts present in said one relay, the status of which is communicated to the second relay, comprising:

means at the one relay for formatting said output bits, which are representative of the result of the fault determination calculation process, into a data packet;

means for directly transmitting said data packet over a communications link to said second relay, such that the results of the fault determination calculation process in said first relay, in the form of output bits, is communicated to the second relay without the use of output contacts in the first relay; and means at the second relay for receiving said data packet, verifying the validity of said data packet, obtaining the transmitted output bits from said data packet and then utilizing said obtained output bits as input bits in its own fault determination calculation process.

2. An apparatus of claim 1, wherein the communication is between two relays, in both directions, on a power transmission line.

3. An apparatus of claim 1, wherein said one relay is on a power line and communication is in one direction to a second relay located at an upstream portion of the power system.

4. An apparatus of claim 1, including means within the transmitted data packet for verifying the validity of the data in the packet.

5. An apparatus of claim 4, wherein the validity of the data is expressed in the form of additional bits in the data packet.

6. An apparatus of claim 1, wherein the means for transmitting includes a transmit module, and wherein the means for receiving includes a receive module which receives and stores the transmitted data.

7. An apparatus of claim 1, including means for programming the protective relays to accomplish selected monitoring functions, wherein the output bits are representative of the results of said monitoring functions.

* * * * *

(12) EX PARTE REEXAMINATION CERTIFICATE (5228th)
United States Patent
Schweitzer, III et al.

(10) Number: US 5,793,750 C1
(45) Certificate Issued: Nov. 8, 2005

(54) SYSTEM OF COMMUNICATING OUTPUT FUNCTION STATUS INDICATIONS BETWEEN TWO OR MORE POWER SYSTEM PROTECTIVE RELAYS

(75) Inventors: Edmund O. Schweitzer, III, Pullman, WA (US); Gary W. Scheer, Pullman, WA (US)

(73) Assignee: Schweitzer Engineering Laboratories, Inc., Pullman, WA (US)

Reexamination Request:
No. 90/007,263, Oct. 21, 2004

Reexamination Certificate for:
Patent No.: 5,793,750
Issued: Aug. 11, 1998
Appl. No.: 08/655,008
Filed: May 29, 1996

Related U.S. Application Data

(63) Continuation of application No. 08/546,477, filed on Oct. 20, 1995, now abandoned.

(51) Int. Cl.$^7$ .................................................. H02H 7/26
(52) U.S. Cl. ........................................... 370/242; 361/64
(58) Field of Search ................................. 370/242, 244, 370/250, 389, 392; 361/61, 64, 65, 66, 68, 73

(56) References Cited

U.S. PATENT DOCUMENTS

| | | | |
|---|---|---|---|
| 3,702,379 A | 11/1972 | Peterson et al. | |
| 4,015,206 A | 3/1977 | Huntley | |
| 4,148,087 A | 4/1979 | Phadke | |
| 4,276,605 A | 6/1981 | Okamoto et al. | |
| 4,420,805 A | 12/1983 | Yamaura et al. | |
| 4,502,086 A | 2/1985 | Ebisaka | |
| 4,528,611 A | 7/1985 | Udren | |
| 4,561,120 A | 12/1985 | Andow et al. | |
| 4,672,501 A | 6/1987 | Bilac et al. | |
| 4,731,689 A | 3/1988 | Nimmersjo et al. | |
| 4,821,137 A | 4/1989 | Wilkinson | |
| 4,896,241 A | 1/1990 | Li et al. | |
| 4,899,383 A | 2/1990 | Einolf, Jr. et al. | |
| 5,095,399 A | 3/1992 | Terada et al. | |
| 5,185,736 A | 2/1993 | Tyrrell et al. | |
| 5,293,295 A | 3/1994 | Nishitani | |
| 5,317,472 A | 5/1994 | Schweitzer, III | |
| 5,341,268 A | * 8/1994 | Ishiguro et al. | 361/62 |
| 5,367,426 A | 11/1994 | Schweitzer, III | |
| 5,473,608 A | 12/1995 | Gagne et al. | |

FOREIGN PATENT DOCUMENTS

| | | |
|---|---|---|
| EP | 0 231 528 A2 | 8/1987 |
| EP | 0 384 435 A2 | 8/1990 |
| EP | 0 437 861 A2 | 7/1991 |
| EP | 0 455 314 A2 | 11/1991 |
| EP | 0 488 123 A2 | 6/1992 |
| EP | 0 525 428 A1 | 2/1993 |
| JP | 54105750 | 8/1979 |
| JP | 54132747 | 10/1979 |
| JP | 1268423 | 10/1989 |
| JP | 1303011 | 12/1989 |
| JP | 2013220 | 1/1990 |
| JP | 2106126 | 4/1990 |
| WO | WO 86/00488 | 1/1986 |
| WO | WO 88/05543 A1 | 7/1988 |
| WO | WO 89/09411 A1 | 10/1989 |

OTHER PUBLICATIONS

Edmund O. Schweitzer III, "Four new digital relays for overhead transmission line protection", 12th Annual Western Protective Relay Conference, Oct. 22–24, 1985, USA.

* cited by examiner

*Primary Examiner*—Afsar Qureshi

(57) ABSTRACT

The communication system includes transmitting output status bits indicative of a function of the relay directly from one microprocessor-based protective relay in a power system to a second companion microprocessor-based relay. Each relay has transmit and receive modules connected by a communications link, with the transmit and receive modules using the logic output and input bits produced by the respective relays in their respective relay calculations.

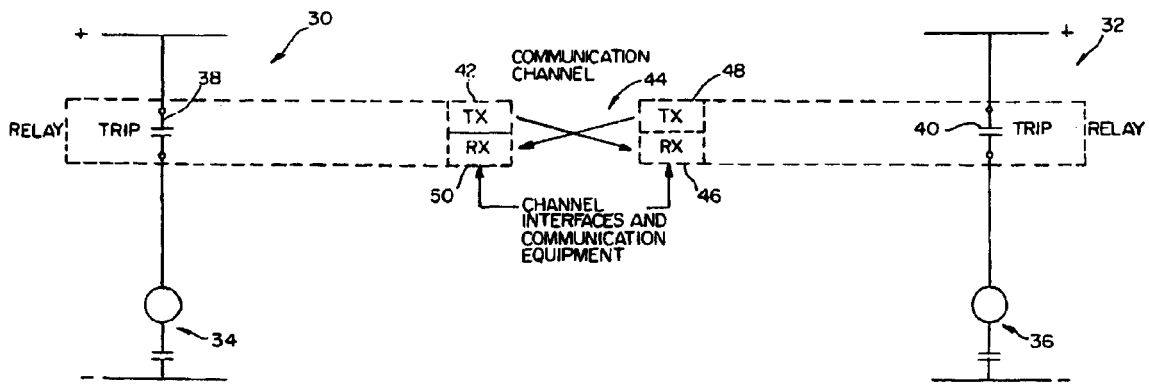

EX PARTE REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claims 1–7 is confirmed.

* * * * *